United States Patent Office 3,451,838
Patented June 24, 1969

3,451,838
PROCESS OF COATING PLASTICS WITH ORGANOPOLYSILOXANES AND ARTICLES MADE THEREBY
Alfred J. Burzynski and Carl A. Johnson, Toledo, Ohio, assignors to Owens-Illinois, Inc., a corporation of Ohio
No Drawing. Filed Dec. 3, 1965, Ser. No. 511,353
Int. Cl. B44d *1/22, 1/44;* B32b *27/08*
U.S. Cl. 117—33.3                                12 Claims

ABSTRACT OF THE DISCLOSURE

Process of providing a hard, acetone resistant, heat resistant and mar resistant coating on articles having a polycarbonate or acrylic surface by applying to the surface a solvent-soluble, further curable organopolysiloxane in an organic solvent and thereafter evaporating the solvent and finally curing the organopolysiloxane. The solvent-soluble, further curable organopolysiloxane is made in a certain way by heating methyltrialkoxysilane or mixture of methyltrialkoxysilane and phenyltrialkoxysilane in water at 50–80° C. for 1 to 10 hours to form a partial condensation product, heating this product at about 80° to 300° C. to remove alkanol by-product and water, and thereafter heating the product below the gel point at from about 90° to 140° C. to provide the solvent-soluble, further curable organopolysiloxane.

---

This invention generally relates to organopolysiloxane coating compositions for plastics and resins, processes for the application of the same and articles which are coated with these compositions. The invention is specifically concerned with an organopolysiloxane coating composition which can be applied to polycarbonate resins, melamine formaldehyde resins, methylmethacrylate resins, polyethylene, polypropylene, fluorocarbon resins, etc.

A large number of coating compositions for plastics and resins are generally known in the prior art. However, these coating compositions are generally deficient in that they are difficult to apply, possess poor hardness and mar resistance. These prior art coating compositions are also susceptible to attack by solvents and have poor heat resistance. These prior art coating compositions are particularly deficient in that they are detrimentally affected by ultraviolet and infrared radiation. Likewise, these prior art coating compositions generally show poor fungal and bacterial resistance.

Generally, there has been a long felt need in the paint industry for a coating composition for plastics and resins which will overcome these difficulties. Accordingly, it is the object of this invention to produce a coating composition which can be easily applied, has excellent hardness and hence excellent wear and cleaning characteristics. Likewise, it is an object of this invention to produce a coating composition for plastics and resins which is not detrimentally affected by solvents and is not degraded by visible, ultaviolet or infrared radiation.

More specifically, an object of this invention is to produce a superior coating composition for use on plastic and resinous substrates.

These objects are accomplished by the use of a partially polymerized trifunctional organosiloxane compound as a coating composition, followed by the further in situ polymerization of this organosiloxane compound. The coating compositions of this invention generally comprise solvent solutions of organopolysiloxane compounds.

Organpolysiloxane compounds which are adapted for use in the subject invention are produced by the hydrolysis and condensation of at least one compound embraced by Formula I wherein:

(I)                $T_nSiZ_{(4-n)}$ wherein:
T independently generally represents a member such as alkyl, alkenyl and aryl. More specifically, T is independently a member such as alkyl, e.g., methyl, ethyl and propyl through hexyl (both normal and isomeric forms), cyclopentyl, cyclohexyl, vinyl and the normal and isomeric forms of propenyl through hexenyl and phenyl;
Z independently generally represents a hydrolyzable group. More specifically, Z is independently a member such as halogen (chloride, bromine, fluorine and iodine), alkoxy (e.g., methoxy through heptoxy), and acyloxy (e.g., acetoxy, propionoxy, butyroxy, pentanoxy, hexanoxy, etc.) and aryloxy, e.g., phenoxy;
$n$ represents a positive integer of less than 4 but is preferably one.

In Formula I as given above for substituent Z, alkoxy groups are preferred because their hydrolysis products are less acidic, and therefore the siloxane condensation can be better controlled. Alkoxy groups of less than 5 carbon atoms are especially advantageous (and are preferred) for the radical represented by Z in Formula I, because the rate of hydrolysis can be inconveniently slow when the organic hydrolyzable radical(s) have a higher molecular weight (i.e., more carbon atoms).

It will be understood, of course, by those skilled in the art that some or all of the Z's in Formula I can also represent an —OH group. Hence, the term "hydrolyzable" as used herein and in the appended claims is intended to include within its meaning compounds wherein the hydrolyzable group or groups have already been hydrolyzed to an —OH group or groups, unless it is clear from the context that the more limited meaning is intended. The terms "hydrolysis" product and "condensation" product as used in the preceding paragraph and elsewhere in this specification, and in the appended claims, are intended to include within their meaning the co-hydrolysis and co-condensation products that result when mixtures of silicon-containing starting reactants are employed.

Preferred organosiloxane compositions adapted for use in this invention consist essentially of a solvent solution of a compound represented by Formula II (II)
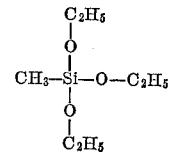

or a solvent solution of a mixture of compounds as represented by Formulae III and IV (III)
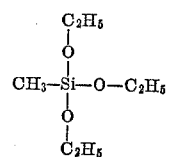

(IV)
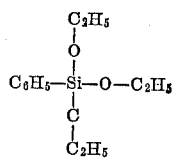

During the in situ polymerization compounds III and IV link together to form a copolymer. The molar ratio of the compound as represented by Formula III to the compound as represented by Formula IV can be from 1:10 to 10:1 with a more preferred ratio being 1:5 to 5:1. A most preferred composition is produced by the condensation of 2 moles of the compound as represented by Formula III with one mole of the compound as represented by Formula IV. Up to 10 mole percent but preferably up to 5 mole percent of diphenylsilanediol can be incorporated into the copolymer that is produced by the condensation of compounds as are represented by Formulae III and IV by co-condensation.

In the subject invention at least one monomeric organosilane compound as is represented by Formulate I, II, III and IV is converted into a solid organopolysiloxane coating by the following general procedure. The organosilane compound or compounds are hydrolyzed at a temperature of from about 50 to about 80° C. for a period of time of from about 1 to about 10 hours, in the presence of water. The temperature is then raised from 80 to about 300° C. for a period of time of from about 1 minute to about 30 minutes to effect the removal of the byproduct alcohol and excess water. This also effects the further condensation of the product to produce a heat-curable organopolysiloxane. This partially condensed organopolysiloxane is then dissolved in a solvent as will be described herein below. The heat-curable organopolysiloxane is then partially cured at a temperature of from about 90 to about 135° C. for a period of time of from about ½ to about 24 hours. This partially cured product is then finally cured at a temperature of from about 90 to about 135° C. for a period of time of from about 4 to about 168 hours, depending upon the softening point of the plastic.

During condensation the above discussed organosilane compounds cross-link to form compounds that exhibit exceptional physical properties such as stability and hardness.

The coating composition of this invention generally comprise from about 5 to about 85 percent by weight of an organopolysiloxane composition as described above, the balance of the coating composition being the solvent. A more preferred coating composition comprises a solution containing from about 40 to about 60 percent by weight of the organopolysiloxane. With a most preferred concentration being 50 percent by weight. While a plurality of solvents can be utilized in this invention polar solvents are particularly adapted for use in this phase of the invention. Examples of solvents which are adapted to the subject invention include dioxane, methanol, ethanol, butanol, acetone, ethyl acetate, benzene, xylene, toluene, ethylene glycol monomethyl ether, ethylene glycol monomethyl ether acetate, ethylene glycol ethyl ether, ethylene glycol ethyl ether acetate, ethylene glycol ethyl butyl ether, ethylene glycol butyl ether acetate, ethylene glycol dibutyl ether, ethylene glycol monohexyl ether, ethylene glycol monophenyl ether, etc.

The composition and preparation of the above described monomeric organosilane compounds and their subsequent polymerization and copolymerization is fully discussed in copending U.S. patent application, Ser. No. 306,344, filed Sept. 3, 1963, now abandoned, and U.S. patent application, Ser. No. 370,684, filed May 27, 1964, now abandoned, these applications having an assignee that is common with the assignee of this invention.

The coating compositions of the invention at hand can be applied to many types of plastics and resins. Examples of suitable substrates include natural and synthetic organic polymeric and resinous substances, both homopolymeric and copolymeric, such as (1) vinyl resins formed by the polymerization of vinyl halides or by the copolymerization of vinyl halides with unsaturated polymerizable compounds, e.g., vinyl esters, $\alpha,\beta$-unsaturated acids, $\alpha,\beta$ - unsaturated esters, $\alpha,\beta$ - unsaturated ketones, $\alpha,\beta$-unsaturated aldehydes and unsaturated hydrocarbons such as butadienes and styrenes; (2) poly-$\alpha$-olefins such as polyethylene, polypropylene, polybutylene, polyisoprene and the like, including copolymers of poly-$\alpha$-olefins; (3) polyurethanes such as are prepared from polyols and organic polyisocyanates; (4) polyamides such as polyhexamethylene adipamide; (5) polyesters such as polymethylene terephthalates; (6) polycarbonates; (7) polyacetals; (8) polyethylene oxide; (9) polystyrene including copolymers of styrene with monomeric compounds such as acrylonitrile and butadiene; (10) acrylic resins as exemplified by the polymers of methyl acrylate, acrylamide, methylol acrylamide, acrylonitrile, and copolymers of these with styrene, vinyl pyridines, etc.; (11) neoprene; (12) condensates of aldehydes, especially formaldehyde and formaldehyde engendering substances such as paraformaldehyde; (13) modified and unmodified condensates of hydroxy benzenes like phenol, resorcinol, etc., with the aforementioned aldehydes; (14) silicones such as dimethyl and methyl hydrogen polysiloxanes; (15) unsaturated polyesters; (16) cellulose esters including the nitrate, acetate, propionate; and (17) fluorohydrocarbons such as tetrafluoroethylene, etc. This list is not meant to be limiting or exhaustive but merely to illustrate the wide range of polymeric materials which may be employed in the present invention. However, the compositions of this invention are particularly suited for the treatment and finishing of plastic and resinous surfaces where a hard, wear resistant, weather resistant surface that has outstanding resistance to ultraviolet degradation is desirable.

The invention at hand is particularly suited to the coating of polycarbonate resins, melamine formaldehyde resins, methyl methacrylate resins, polystyrene, polyvinyl chloride, polyethylene, polypropylene, tetrafluoroethylene, etc.

Generally, the only requisite for a substrate for use in this invention is that it must have sufficient dimensional stability at elevated temperatures to allow the curing of the organopolysiloxane.

The organopolysiloxane compounds as described above contain hydrolyzable groups. During curing, these hydrolyzable groups tend to react in such a way that a very tenacious bond is formed with the plastic or resinous substrate.

The compounds applicable to the subject invention as described above have greater residual functionality than usual silicones made from difunctional monomers, that is, they contain more sites at which polymerization can take place. Because of this, these compounds cross-link during curing so as to impart a hard, mar resistant, tough solvent and heat resistant surface to the surface which is being treated. The above mentioned heat resistant properties are particularly advantageous where it is desirous to coat a substrate having poor heat resistance which must be subject to intermittent high temperature exposure. Other advantages of this invention include the fact that the surfaces which are treated tend to be resistant to attack by bacteria and fungi. Likewise, the organopolysiloxane coating compositions of this invention tend to function as a heat resistant and flame retardant barrier for plastic and resinous substrates.

The coating compositions of this invention also exhibit light transparency in the visible range with 90 percent or more transmission. Likewise, the subject coatings show superior solvent and water resistance. Finally, the coatings of this invention are advantageous in that they do not tend to outgas even when exposed in vacuo to temperatures up to 450° C. and electron beams.

The coating compositions of the prior art tend to be degraded by ultraviolet and visible radiation. Conversely, the coating compositions of this invention allow almost complete passage of ultraviolet and visible radiation. Due to the fact that ultraviolet light is not absorbed, the coating compositions of this invention are particularly suited for outdoor use in that they are not susceptible to degradation by the various wavelength of radiation contained in sunlight.

The cured composition of this invention produce coatings having a high gloss. Because the coatings of this invention are not affected by ultraviolet, visible or infrared radiation this high gloss is retained when the coatings are exposed to sunlight and weather for extended periods of time. It is to be noted that by the appropriate addition of additive components the high gloss finish of the subject coating compositions can be eliminated to produce a semi-gloss surface.

Regardless of the above described radiation passage properties, the compositions of this invention can be doped in such a way that the treated surface is likewise not susceptible to degradation. That is, small percentages of various radiation absorbing compounds can be added to the compositions of this invention which will effectively block the passages of harmful radiation through to the treating surface. This problem is particularly acute in plastic and resinous surfaces which must be exposed to natural and artificial sources of ultraviolet radiation. When the coating compositions of this invention are utilized, small percentages of selected doping agents can be added to the coating composition which will effectively absorb the harmful radiation thereby preventing the degradation of the substrate.

It is to be noted that the subject organopolysiloxane compositions are particularly suited to doping with ultraviolet absorbing compounds. The coating compositions of this invention can contain any percentage of a radiation absorbing compound up to a saturated solution. Preferred coating compositions contain only a minor amount of radiation absorbing compound, that is from about 1 to about 5 percent of a radiation absorbing compound. Examples of radiation absorbing compounds adapted to this invention are compounds such as 2-hydroxy-4-methoxybenzophenone, 2,2' - dihydroxy-4-methoxybenzophenone, etc.

The problems mentioned above with regard to the degradation of a polymeric or resinous substrate by exposure to radiation are particularly acute where the polymeric or resinous substrates must be exposed to a constant radiation source. A specific example of this problem is lamp lenses for mercury vapor lamps that are extensively used in outdoor lighting. It is extremely advantageous to form these lenses from a material that is not susceptible to vandalous breakage and yet allows almost complete transmission of the visible light. In view of these requirementss the field of potential materials from which these lenses can be manufactured is limited to polycarbonate type plastics, methacrylates, acrylics and polyvinyl chloride.

However, these materials tend to degrade and discolor in the presence of the ultraviolet light which is incident to the visible light produced by the above mentioned mercury vapor lamps. In view of this, lenses formed from these materials have a relatively short life. When these lenses are coated as per the composition and method of this invention with a doped organopolysiloxane compound the useful life of these lenses is extended indefinitely. That is these lenses are coated with an organopolysiloxane compound which is doped with an ultraviolet light absorbing compound that adsorbs the harmful bands of radiation that are responsible for the degradation of the lens material. Therefore the lenses do not tend to yellow in use.

A preferred embodiment of this aspect of the subject invention is the coating of polycarbonate lens for use in mercury vapor lamps with an organopolyisiloxane that is described in regard to the above mentioned Formulas III and IV, said organopolysiloxane being doped with 5 percent of 2,2'-dihydroxy-4-methoxy benzophenone.

The subject invention may also be used to coat other objects such as plastic, autotrim, tail lights, covertible car windows, etc. It is obvious to one skilled in the art that the coating compositions of this invention can be doped to filter out any band of radiation that is harmful to a polymeric or resinous substrate.

In addition to the above protective properties the coating composition of this invention are desirous in that they increase the efficiency of lamps by permitting the surfaces to be cleaned readily. The resulting glass like surfaces permit easy cleaning and the surface is not marred or scratched. This point is important due to the fact that polycarbonate and acrylate resins scratch very easily. The coatings of this invention are also advantageous in that they have excellent impact resistance.

The coatings of this invention may also be considered as a primer coat for plastic substrates to be painted or decorated. That is, these coatings function as a base coat for the subsequent application of other materials.

The organopolysiloxane coating compositions of this invention can be applied by a plurality of methods, for example brushing, spraying, rolling, etc. The subject compositions have excellent flow and viscosity characteristics with the result that they are easy to apply and the treated surfaces tend to be smooth and even, having no brush marks, etc. The viscosity of the coating composition of this invention can be carefully controlled with the result that these coating compositions can be adapted to simultaneously coating and filling of porous or uneven surfaces. Likewise by varying the viscosity the thickness of the coating can be carefully controlled.

The method aspect of this invention is effected in accordance with the following description. After application of the coating compositions of this invention to a surface the solvent component is evaporated and a precure effected at a temeprature of from about 90 to about 135° C. for a period of time of from about ½ to about 24 hours. Following the removal of the solvent the final curing is effected at a temperature of from about 90 to about 135° C. for a period of time from about 4 to about 168 hours. A more preferred range of operating conditions is to evaporate the solvent and precure at a temperature of from about 130 to about 140° C., followed by a final cure at a temperature of from about 100 to about 135° C., for from about 4 to about 24 hours depending upon the temperature stability of the substrate.

The organopolysiloxane coatings as described above do not require a pretreatment of the plastic or resinous substrate in order to achieve adhesion. However, complete uniformity of adhesion can be insured when using a wide variety and source of plastics and resins by pretreating the substrate with for example, a flame, a corona discharge or a chromic acid solution.

It is within the purview of this tinvention to add to the coating compositions of this invention compatible materials which do not affect the basic and novel characteristics of these compositions. Among such materials are coloring agents, including dyes and pigments, fillers and similar additives. Additives such as antioxidants, antistatic agents, stabilizers and anti-foaming, may also be added. The upper limit of the quantity of additives is usually 50 weight percent of the coating composition.

The following examples will illustrate the invention. These examples are given for purposes of illustration and not for the purpose of limiting this invention.

EXAMPLE I

The coating of a polycarbonate panel was effected in accordance with the following. A coating solution was prepared by heating with stirring 100 ml. of a 60 percent ethanol solution of an organopolysiloxane that was produced by the hydrolysis of 2 moles of methyltriethoxysilane with one mole of phenyltriethoxysilane. To the 100 ml. of this solution, was added 5 grams of 2,hydroxy-4-methoxy benzophenone. The heating was carried out on a hot plate in a 250 ml. beaker so that a temperature of 140° C. was reached within 30 minutes. This heating removed the solvent from the organosiloxane and precured the organosiloxane to produce a B stage resin. 100 grams of the B stage resin containing U.V. absorber was then slowly dissolved in 100 grams of ethanol. This ethanol B stage resin solution was used for dip application of the organopolysiloxane onto a 20 mil sheet of a polycarbonate resin. The polycarbonate had been flame treated to insure uniform adhesion. After permitting the ethanol to flash off at room temperature, the coated panel was cured at 135° C. for 18 hours. Panels prepared in this way had a coating thickness of 0.4 mil. The coated panel was placed 6 inches from an ultraviolet lamp (400 watt). After 1000 hours, the coated area was clear and transparent. The uncoated area was yellow and opaque. The coating on these panels withstood an impact of 15 ft. lbs. with an estimated 60% extension of polycarbonate sheet. The coating surface was resistant to scratching while the uncoated surface could be readily scratched with a fingernail.

EXAMPLE II

The coating procedure as described in Example I, was repeated except that the organopolysiloxane resin utilized was produced by the hydrolysis and condensation of methyltriethoxysilane and acetone was the solvent medium. The coated panel was then tested in accordance with the description given in Example I, with the following results. After 1000 hours, the coated area was clear and transparent. The uncoated area was yellow and opaque. The coating on these panels withstood an impact of 15 ft. lbs. with an estimated 60% extension of polycarbonate sheet. The coated surface could not be scratched with a fingernail while the uncoated surface could be readily scratched with a fingernail.

EXAMPLES III–VI

Plastic samples were coated with the resin and procedure described in Example I, except for the change in curing temperature and time as specified. The results of these tests are as listed in Table I. In all cases, the plastic substrate was pretreated by immersion in a solution comprising 92 grams of potassium dichromate, 1464 grams of sulfuric acid and 458 grams of water. Subsequent to this pretreatment the surface was rinsed in water and air dried.

TABLE I

| Substrate | Cure temperature (°C.) | Cure time (hr.) | Adhesion |
|---|---|---|---|
| Polyethylene | 90 | 48 | Excellent. |
| Methyl methacrylate resin | 90 | 48 | Do. |
| Cellulose filled melamine resin | 120 | 18 | Do. |
| Polyvinyl fluoride | 135 | 18 | Do. |

EXAMPLES VII–VIII

Plastic samples were coated with the resin and procedure as described in Example II, except for the change in curing temperature and time as specified. The results of these tests are listed in Table II. In all cases, the plastic substrate was pretreated by immersion in a solution comprising 92 grams potassium dichromate, 1464 grams of sulfuric acid and 458 grams of water. Subsequent to this pretreatment the surface was rinsed in water and air dried.

TABLE II

| Substrate | Cure temperature (°C.) | Cure time (hr.) | Adhesion |
|---|---|---|---|
| Polyethylene | 90 | 48 | Excellent. |
| Polyvinyl fluoride | 135 | 18 | Do. |

What is claimed is:
1. A process for producing an article having a plastic surface in which the plastic is of the group consisting of an acrylic resin and a polycarbonate resin, the coated plastic surface being hard, mar resistant, heat resistant and acetone resistant, the process comprising the steps of:
 (1) applying a solution of a solvent-soluble, further curable organopolysiloxane in an organic solvent on the plastic surface, the further curable organopolysiloxane being a precured hydrolysis and condensation product of a silane of the group consisting of methyltrialkoxysilane and a mixture of methyltrialkoxysilane and phenyltrialkoxysilane in which the alkoxy group contains less than 5 carbon atoms and water at about 50 to 80° C. for about 1 to 10 hours to form a siloxane partial condensation product which is then heated at a temperature of about 80° to 300° C. to remove alkanol by-product and water, after which the resultant product is precured by heating at a temperature below the gel point thereof and in the range of about 90° to 140° C. to provide the precured, further curable organopolysiloxane, and
 (2) evaporating the solvent for the organopolysiloxane and finally curing the organopolysiloxane to provide a thermoset organopolysiloxane on the plastic surface.
2. A process as defined in claim 1 in which the plastic is an acrylic resin.
3. A process as defined in claim 1 in which the plastic is a polycarbonate resin.
4. A process as defined in claim 1 in which the organic solvent is a member of the group consisting of methanol, ethanol, butanol, acetone, ethyl acetate, benzene, dioxane, xylene, toluene, ethylene glycol monomethyl ether, ethylene glycol monoethyl ether, or ethylene glycol monobutyl ether.
5. A process as defined in claim 1 inwhich an ultraviolet light absorbing compound is applied to the plastic surface in admixture with the further curable organopolysiloxane to thereby protect the plastic surface from ultraviolet light radiation.
6. A process as defined in claim 1 in which the silane is methyltrialkoxysilane.
7. A process as defined in claim 1 in which the silane is methyltriethoxysilane.
8. A process as defined in claim 1 in which the silane is a mixture of methyltrialkoxysilane and phenyltrialkoxysilane.
9. A process as defined in claim 5 in which the ultraviolet light absorbing compound in 2-hydroxy-4-methoxy benzophenone.
10. A product produced by the process defined in claim 1.
11. A product as defined in claim 10 in which the plastic is an acrylic resin.
12. A product as defined in claim 10 in which the plastic is a polycarbonate resin.

References Cited

UNITED STATES PATENTS

| 2,893,898 | 7/1959 | Evans et al. | 117—161 |
| 2,962,390 | 11/1960 | Fain et al. | 117—64 |
| 2,973,287 | 2/1961 | McBride | 117—161 X |
| 2,976,185 | 3/1961 | McBride | 117—161 X |
| 2,976,259 | 3/1961 | Hardy et al. | 260—45.95 |
| 3,085,097 | 4/1963 | Strobel et al. | 117—33.3 X |
| 3,367,910 | 2/1968 | Newing | 260—46.5 |

WILLIAM D. MARTIN, *Primary Examiner.*

T. G. DAVIS, *Assistant Examiner.*

U.S. Cl. X.R.

117—138.8, 161

PO-1050
(5/69)

UNITED STATES PATENT OFFICE
CERTIFICATE OF CORRECTION

Patent No. 3,451,838            Dated  June 24, 1969

Inventor(s)   Alfred J. Burzynski and Carl A. Johnson

It is certified that error appears in the above-identified patent and that said Letters Patent are hereby corrected as shown below:

Column 1, line 60, "ultaviolet" should be - - ultraviolet - - .  Column 2, line 2, delete "wherein:"; line 69, formula IV, that portion of the formula reading "Si
$$\begin{array}{c} \text{Si} \\ | \\ \text{C} \\ | \\ \text{C}_2\text{H}_5 \end{array}$$
"
should read - - Si
$$\begin{array}{c} | \\ \text{O} \\ | \\ \text{C}_2\text{H}_5 \end{array}$$
- -
Column 3, line 13, "Formulate" should be - - Formulae - - .
Column 5, line 1, "composition" should be - - compositions - -;
line 16, "passages" should be - - passage - -; line 31, insert
- - a - - before "radiation"; line 40, "substrates" should be
- - substrate - - ; line 47, "requirementss" should be - -
requirements - - ; line 67, "organopolyisiloxane" should be
- - organopolysiloxane - - ; line 73, a space should be between
"auto" and "trim"; line 73, "covertible" should be - -
convertible - - .  Column 6, line 32, "temeprature" should be
- - temperature - - ; line 50, "tinvention" should be - -
invention - - .  Column 8, line 34, a space should be between
"in" and "which".

SIGNED AND
SEALED (SEAL)
Attest:

Edward M. Fletcher, Jr.
Attesting Officer

WILLIAM E. SCHUYLER, JR.
Commissioner of Patents